US008370656B2

(12) United States Patent
Gupta

(10) Patent No.: US 8,370,656 B2
(45) Date of Patent: Feb. 5, 2013

(54) POWER AND DATA HUB

(76) Inventor: Aseem Gupta, Dubai (AE)

(*) Notice: Subject to any disclaimer, the term of this patent is extended or adjusted under 35 U.S.C. 154(b) by 373 days.

(21) Appl. No.: 12/843,720

(22) Filed: Jul. 26, 2010

(65) Prior Publication Data
US 2012/0023343 A1 Jan. 26, 2012

(51) Int. Cl.
G06F 1/26 (2006.01)
G06F 13/00 (2006.01)

(52) U.S. Cl. ......... 713/300; 713/323; 710/316; 710/317

(58) Field of Classification Search .................. 713/300, 713/310, 323; 710/316, 317
See application file for complete search history.

(56) References Cited

U.S. PATENT DOCUMENTS

| | | | | |
|---|---|---|---|---|
| 6,073,188 | A * | 6/2000 | Fleming | 710/38 |
| 7,051,215 | B2 * | 5/2006 | Zimmer et al. | 713/300 |
| 7,120,017 | B2 * | 10/2006 | Shieh | 361/695 |
| 7,302,282 | B2 * | 11/2007 | McKim et al. | 455/575.1 |
| 7,327,743 | B2 * | 2/2008 | Lehr et al. | 370/401 |
| 7,375,939 | B2 * | 5/2008 | Weil | 361/45 |
| 7,418,525 | B2 * | 8/2008 | Dalton et al. | 710/5 |
| 7,493,502 | B2 | 2/2009 | Hsieh | |
| 7,769,940 | B2 * | 8/2010 | Wiler | 710/316 |
| 7,813,099 | B2 * | 10/2010 | Chan | 361/119 |
| 7,843,081 | B2 * | 11/2010 | Lim | 307/39 |
| 7,873,844 | B2 * | 1/2011 | Diab et al. | 713/300 |
| 8,001,393 | B2 * | 8/2011 | Hori et al. | 713/300 |
| 8,046,606 | B2 * | 10/2011 | Lu | 713/300 |
| 2006/0171329 | A1 | 8/2006 | Ying | |
| 2007/0041387 | A1 * | 2/2007 | Ghoshal et al. | 370/395.52 |
| 2007/0198748 | A1 | 8/2007 | Ametsitsi et al. | |
| 2008/0028237 | A1 * | 1/2008 | Knight | 713/300 |
| 2008/0155283 | A1 | 6/2008 | Yamamoto et al. | |
| 2008/0209247 | A1 | 8/2008 | Thelander et al. | |
| 2009/0016216 | A1 | 1/2009 | Ballard et al. | |
| 2009/0228722 | A1 * | 9/2009 | Lin | 713/300 |
| 2009/0271013 | A1 | 10/2009 | Chen | |

* cited by examiner

Primary Examiner — Paul R Myers
Assistant Examiner — Trisha Vu
(74) Attorney, Agent, or Firm — Richard C. Litman

(57) ABSTRACT

The power and data hub is a fan-less modular electronic system having a main housing member that forms a heat sink, which houses an electronic switch fabric backbone. The electronic switch fabric backbone connects multiple modular slots using a connection fabric backplane, which provides low voltage power input and command protocols. Cross-matrix switches are provided to interconnect stand-alone audio-visual, computer and other data, such as audio I/O, video I/O, and outputs via the integrated switch fabric backbone. Multifunction modular cards are provided and securely insert into modular slots disposed in the main housing unit. The system includes a control and DC power injector management unit for power control of connected units. Power management instructions can be issued to the main unit and modular cards. A network-based management utility controls, monitors and records operational parameters, and also stores and translates programmed instructions to the device.

9 Claims, 6 Drawing Sheets

POWER AND DATA HUB

BACKGROUND OF THE INVENTION

1. Field of the Invention

The present invention relates to devices for the distribution of electrical power and data to a plurality of disparate devices, and particularly to a power and data hub having improved heat dissipation and that saves energy.

2. Description of the Related Art

Blade servers were developed as stripped down server computers having a modular design optimized to minimize physical space and energy usage. The design objective was to get away from the standard rack-mount server which generally could only hold one server.

A blade enclosure is a chassis that can house multiple thin, modular electronic circuit boards, commonly known as server blades. Moreover, the blade enclosure has resources that provide such services as power, cooling, networking, and a variety of interconnects and management options. Together, blades and the blade enclosure form the blade system.

During operation, electrical and mechanical components produce heat, which a system must displace to ensure the proper functioning of its components. Most blade enclosures, like most computing systems, remove heat by using fans.

A frequently underestimated problem when designing high performance computer systems involves the conflict between the amount of heat a system generates and the ability of its fans to remove the heat. The blade's shared power and cooling means that it does not generate as much heat as traditional servers. Newer blade enclosure designs feature high-speed, adjustable fans and control logic that tune the cooling to the system's requirements, or even liquid cooling systems. This however, adds to the complexity and expense of the system.

The blade enclosure provides one or more network buses to which the blade will connect, and either presents these ports individually in a single location (versus one in each computer chassis), or aggregates them into fewer ports, reducing the cost of connecting the individual devices. Available ports may be present in the chassis itself, or in networking blades.

Since blade enclosures provide a standard method for delivering basic services to computer devices, other types of devices can also utilize blade enclosures. Blades providing switching, routing, storage, SAN and fiber channel access can fit into slots in the enclosure to provide these services to all members of the enclosure. While multimedia matrix switches are available on the market, it would be desirable to provide such a switch in the form of a blade enclosure. Moreover it would be desirable to inexpensively solve the aforementioned cooling problem encountered by many devices that use a blade design.

Thus, a power and data hub solving the aforementioned problems is desired.

SUMMARY OF THE INVENTION

The power and data hub is a device that includes multiple thin, modular electronic circuit boards, similar to blade server boards, that can be configured to have zero watts electrical power consumption when in standby mode. The device provides power distribution and computer network distribution with access to multiple modular slots that provide power and network communication to connected modules, allowing, e.g., switching of audio-visual computer camera inputs and other such data inputs and outputs via an integrated backbone using multifunctional types of modular cards, which can be securely inserted into modular slots in a main housing unit and attached thereto. A control and energy management processing unit issues instructions to the main unit and to the modular cards. An electronic system includes the router and a web-based energy management utility that controls, monitors, and records information with respect to time the device is in use and watts of electrical energy consumed during operation to calculate the total energy saved by the device during standby mode. The device stores and translates programmed instructions issued to the device and to connected external input/output devices.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
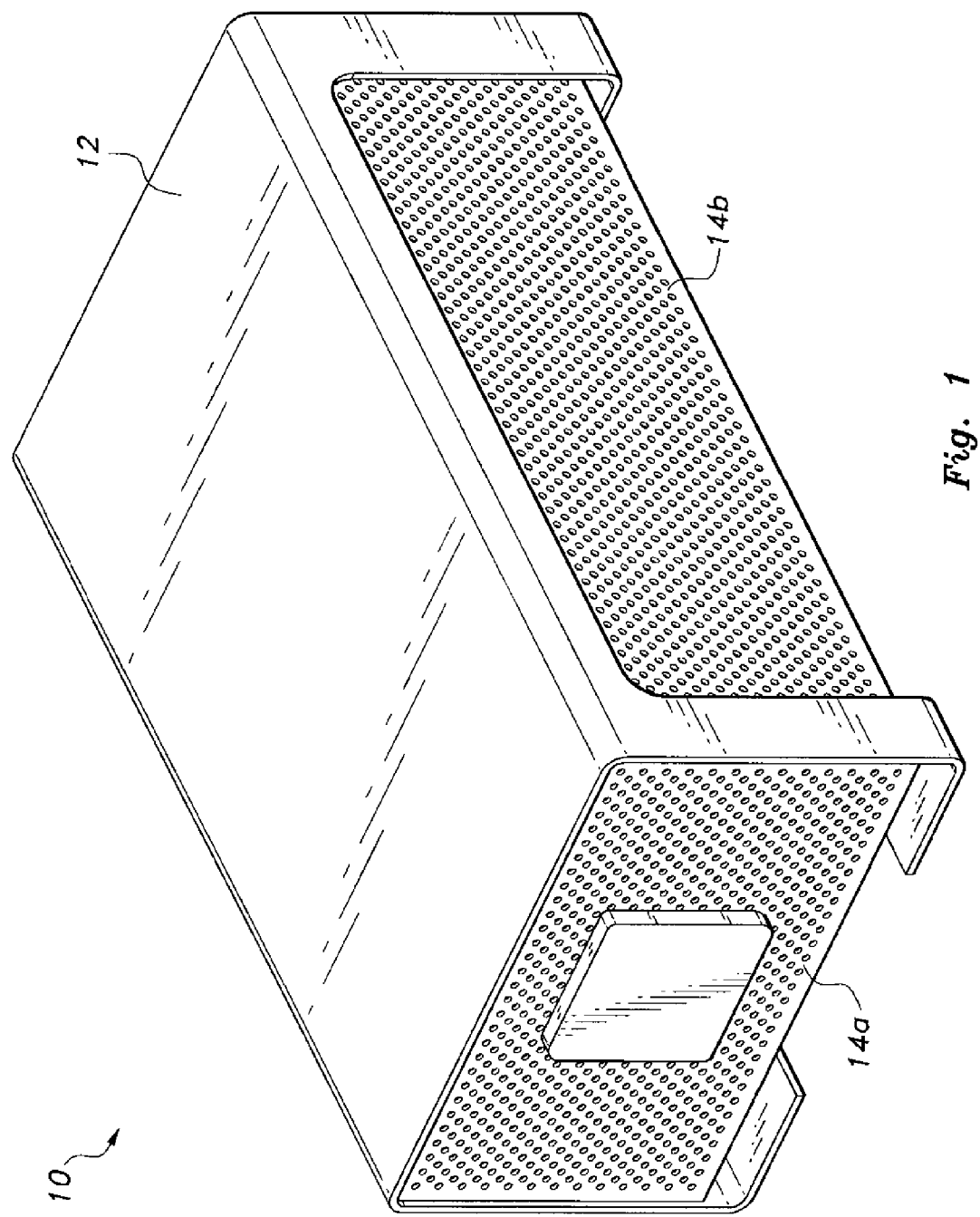
FIG. 1 is a perspective view of a power and data hub according to the present invention.
Figure 2:
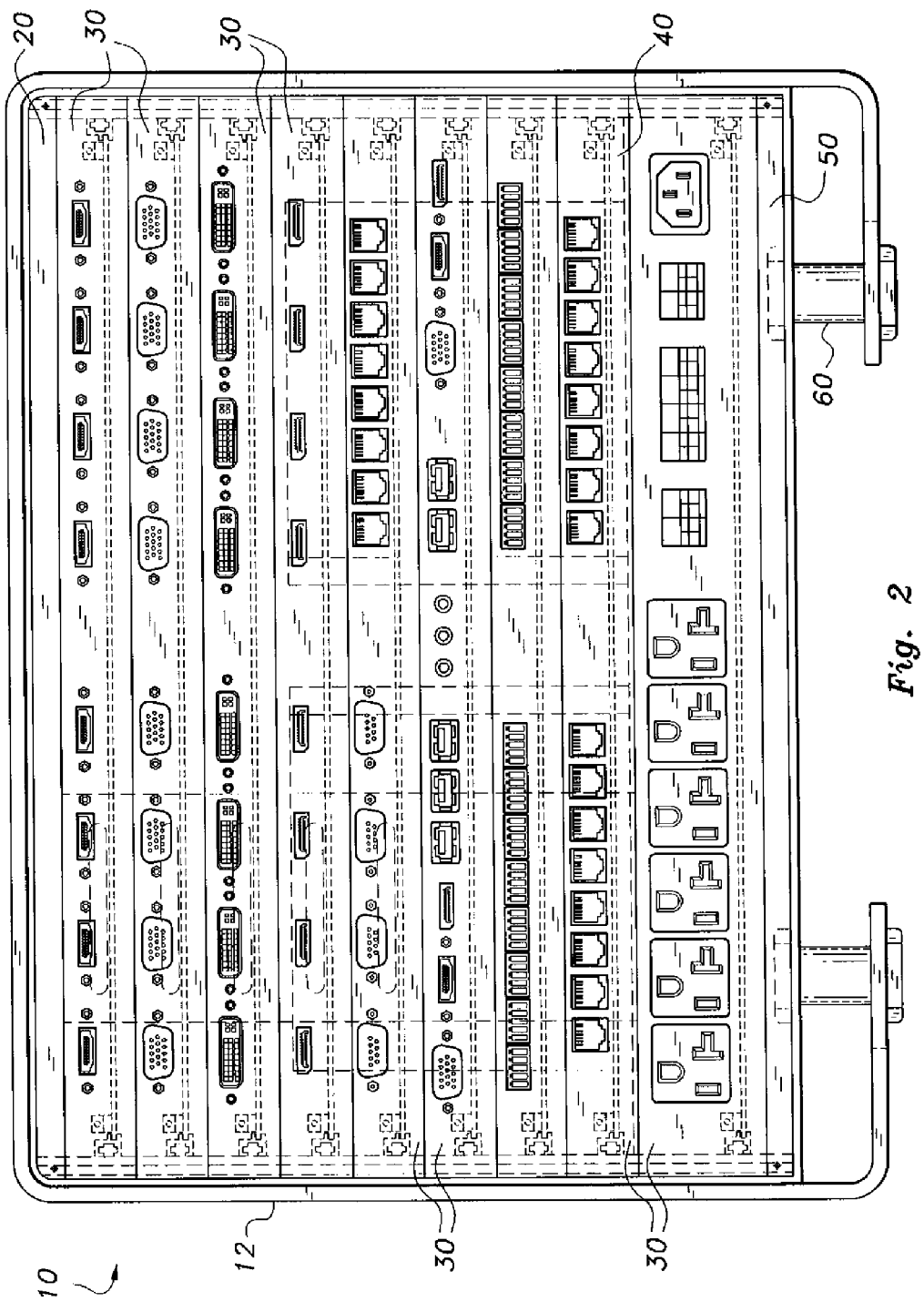
FIG. 2 is an exemplary rear view of the power and data hub according to the present invention.
Figure 3:
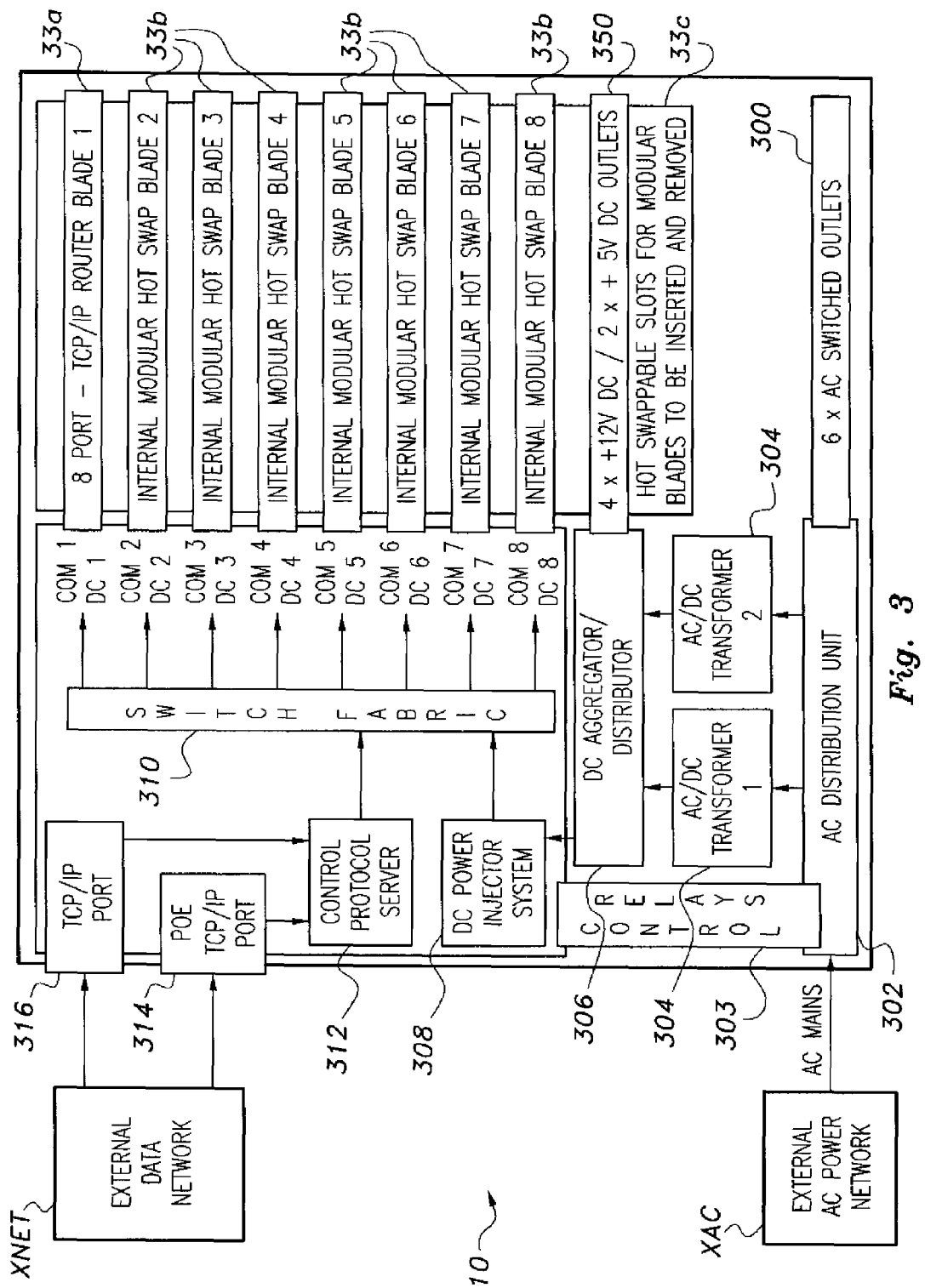
FIG. 3 is a block diagram of the power and data hub according to the present invention.

As shown in FIGS. 1 and 3, the power and data hub 10 is a fan-less modular power and data system having a main housing member 12 that functions as an enclosure for an electronic switch fabric backbone 310 connected to a TCP/IP router thin, modular, hot swappable electronic circuit board 33a and a plurality of internal, modular, hot swappable thin, electronic circuit boards 33b. Housing member 12 has a substantially C-shaped front/rear cross section defining parallel vertical peripheral edges and parallel horizontal peripheral edges. The overall shape of housing member 12 enables the member 12 to function as a heat sink, which provides cooling to the hub components without the use of a fan.

The switch fabric is the network topology in which interconnect architecture used by a switching device redirects the data coming in on one of its ports out to another of its ports. The word "fabric" comes from the resulting crisscrossed lines when all the inputs on a switch with hundreds of ports are connected to all possible outputs. The electronic switch fabric backbone 310 comprises a plurality of cross-matrix switches, which can interconnect stand alone audio-visual, computer and other data, such as audio I/O, video I/O VGA, DVI-I, DVI-D, HDMI, USB, Composite Video, Super Video, Display-Port, Stereo Audio, Digital Audio, and other such analog or digital signal inputs from and to connected audio-visual and computer devices, thereby allowing data capture, network streaming, and transmission of video, audio and data between switch fabric-connected inputs and outputs.

Control and automation of connected electronic and electrical devices, sensors, electrical relays and other types of analog and digital control interfaces is effected by control management software resident in server 312 having programmed instructions executed in accordance with the requirements of the devices connected by the integrated switch fabric backbone 310. The functional units, which are interconnectable via the backbone switch 310, are multifunction modular cards, i.e., blades 33b that securely insert into modular slots 33c disposed in the main housing unit 10. The electronic switch fabric backbone 310 connects multiple modular slots 33c using a connection fabric backplane, which provides low voltage power input and command protocols for connecting the multiple internal modular blades 33b.

The switch fabric backbone 310 can switch any device in the external data network XNET designated as an input to any device in the entire system (including the internal thin, modular, hot swappable electronic circuit boards 33b) designated as an output. Similarly any device in the system designated as an input can be switched to any device in the system designated as an output.

External devices of external data network XNET can be connected to the hub 10 via a Power over Ethernet (POE) TCP/IP Port 314, and a standard TCP/IP port 316, both ports 314 and 316 being disposed inside housing 12 of the hub 10. The hub 10 has a control protocol server 312, which is operably connected to the ports 314 and 316 to support power control and data communication exchange between external data network XNET devices and internal modular thin, hot swappable electronic circuit board devices 33b through switch fabric 310 via a plurality of communication lines "COM" and power control lines "DC".

The unit 10 is powered from an AC mains connection to an external AC power source XAC. Power from the mains is then routed to a plurality of switched outlets 300 and AC/DC transformers 304 via the hub's AC distribution unit 302. The control management software issues instructions for power control of the internal thin, modular, hot swappable electronic circuit boards 33b, as well as external devices connected to the external data network XNET. Control relays 303 route a selected DC voltage to a DC aggregator/distributor 306. The DC distributor powers a plurality of 12-volt and 5-volt DC outlets 350 but the invention is not limited to exemplary outlets 350 and may power a range of DC voltage outputs, generally ranging between 24-volts, 19-volts, or the like. The DC outlets 350 and AC switched outlets 300 are disposed on the rear panel 605.

Additionally, the DC aggregator/distributor 306 routes DC power to a DC power injector system 308. Output of the power injector system 308 is delivered to a portion of the switch fabric 310, wherein, under commands from the control protocol server 312, DC power can be injected to or removed from any combination of internal blade modules 33b. The control and DC power injector management unit 308 provides power control of connected units responsive to network commands sent via PoE port 314.

Power over Ethernet (or PoE) technology describes a system to safely pass electrical power, along with data, on Ethernet cabling. PoE requires category-5 cable or higher for high power levels, but can operate with category-3 cable for low power levels. Power can come from a power supply within a PoE-enabled networking device, such as an Ethernet switch, or from a device built for "injecting" power onto the Ethernet cabling. The DC power injection system 308, being controllable via the PoE/TCP ports 314 and 316, can power up or power down any of the cards 33b connected to the switch fabric backbone 310. The power aggregator 306 can accumulate the power consumption of individual blade components 33b and compute power consumption of individual blades 33b, and can also compute the total power consumption of the power and data hub 10.

Figure 4:
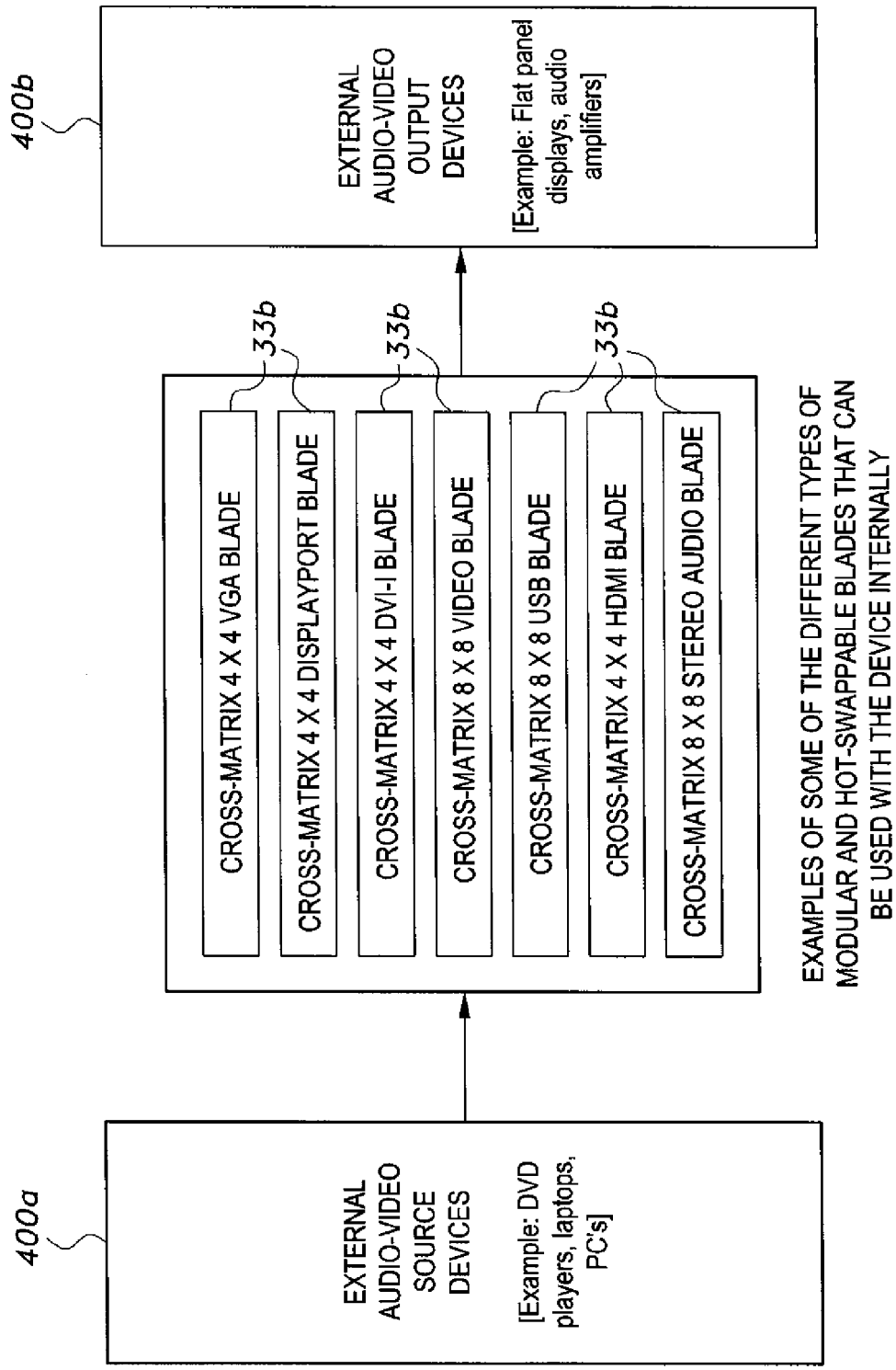
FIG. 4 is a block diagram showing a cross-matrix blade configuration of the power and data hub according to the present invention.
Figure 5:
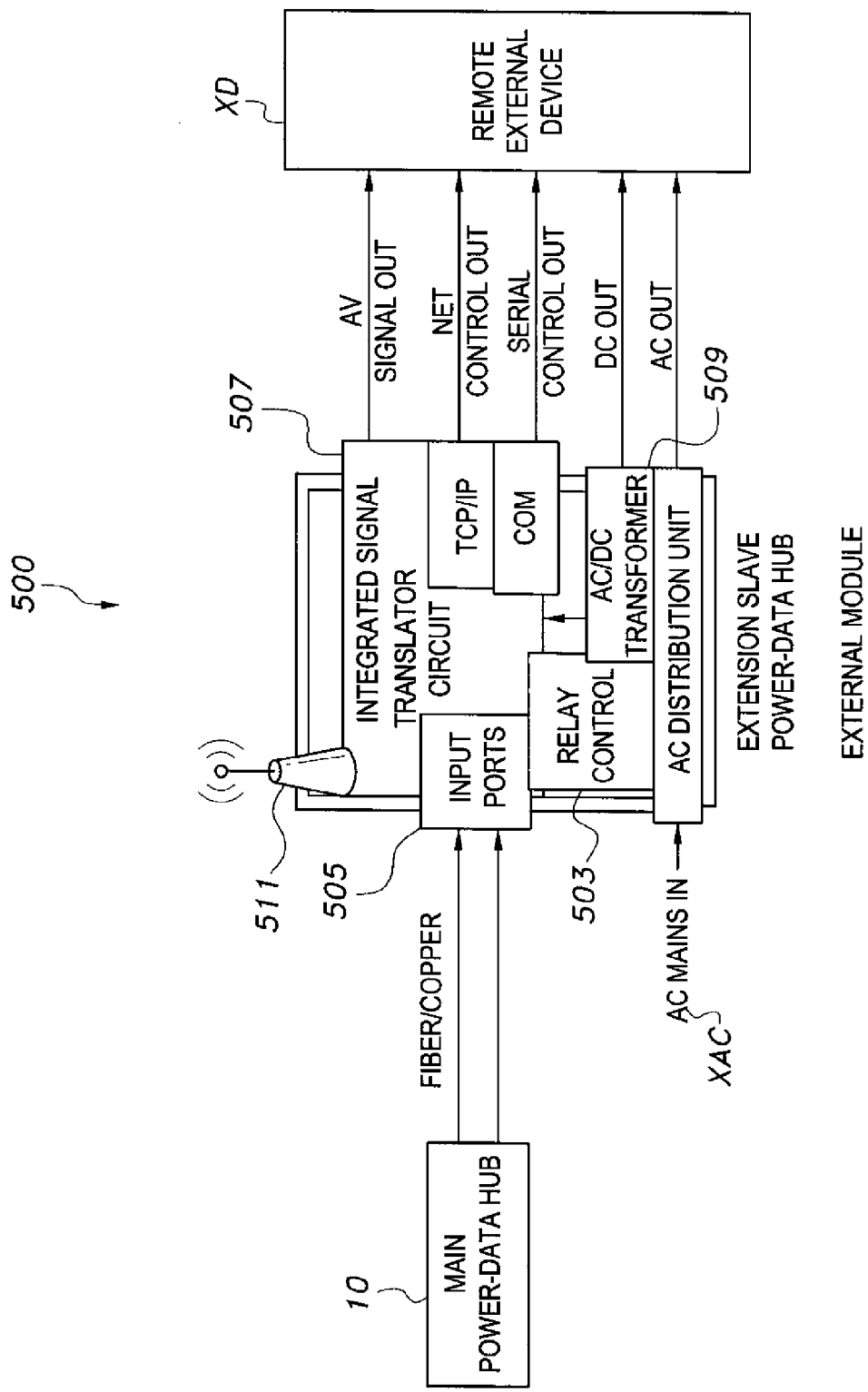
FIG. 5 is a block diagram showing an external extension slave module of the power and data hub according to the present invention.

Power management software can reside in the control protocol server 312, from which power management instructions can be issued to the main unit 10 and to the modular cards 33b. A network-based management utility controls, monitors, and records operational parameters, and also stores and translates programmed instructions to the device 10. As shown in FIG. 4, a wide variety of blade module types may be inserted into the hub to facilitate connection of source devices 400a to output devices 400b. As shown in FIG. 5, remotely located external devices can be controlled by the unit 10 via external slave module 500, which can be connected to the external device XD. The external module has an external AC mains input XAC, which feeds the internal AC/DC transformer and provides for a plurality of switched AC and DC power outlets 509, which are controlled by relay 503 in operable communication with a plurality of copper and/or Fiber TCP/IP input ports 505 and/or wireless receiver 511.

An integrated signal translator circuit provides a plurality of outputs for AV signals, TCP/IP and serial port 507 which are provided to further control operation of the external device XD and provide remote connectivity to inputs connected to the main unit 10 over long cable distances using copper or fiber cable connectivity 505 or over wireless connectivity 511 using industry standard 802.11 wireless communication protocol.

Moreover, the unit provides web-based energy monitoring, management, and control of device internal modules 33b, as well as connected external devices XD, to stop electrical connection when the device (XD or 33b) goes on standby mode. The web-based management utility enables network communication and programming via control software residing on a web server built into the unit 10, and also receives programmed inputs from other devices and user inputs via the network from a server application that stores the commands in a database. The server application also collects usage data and monitors the device, thereby making this information available for further processing and reporting purposes. The ability to manage these devices via network-Internet connection is also provided. The server 312 allows for continuous web-based monitoring control and reporting of energy used/saved by the device, as reported by the aggregator 306.

Figure 6:
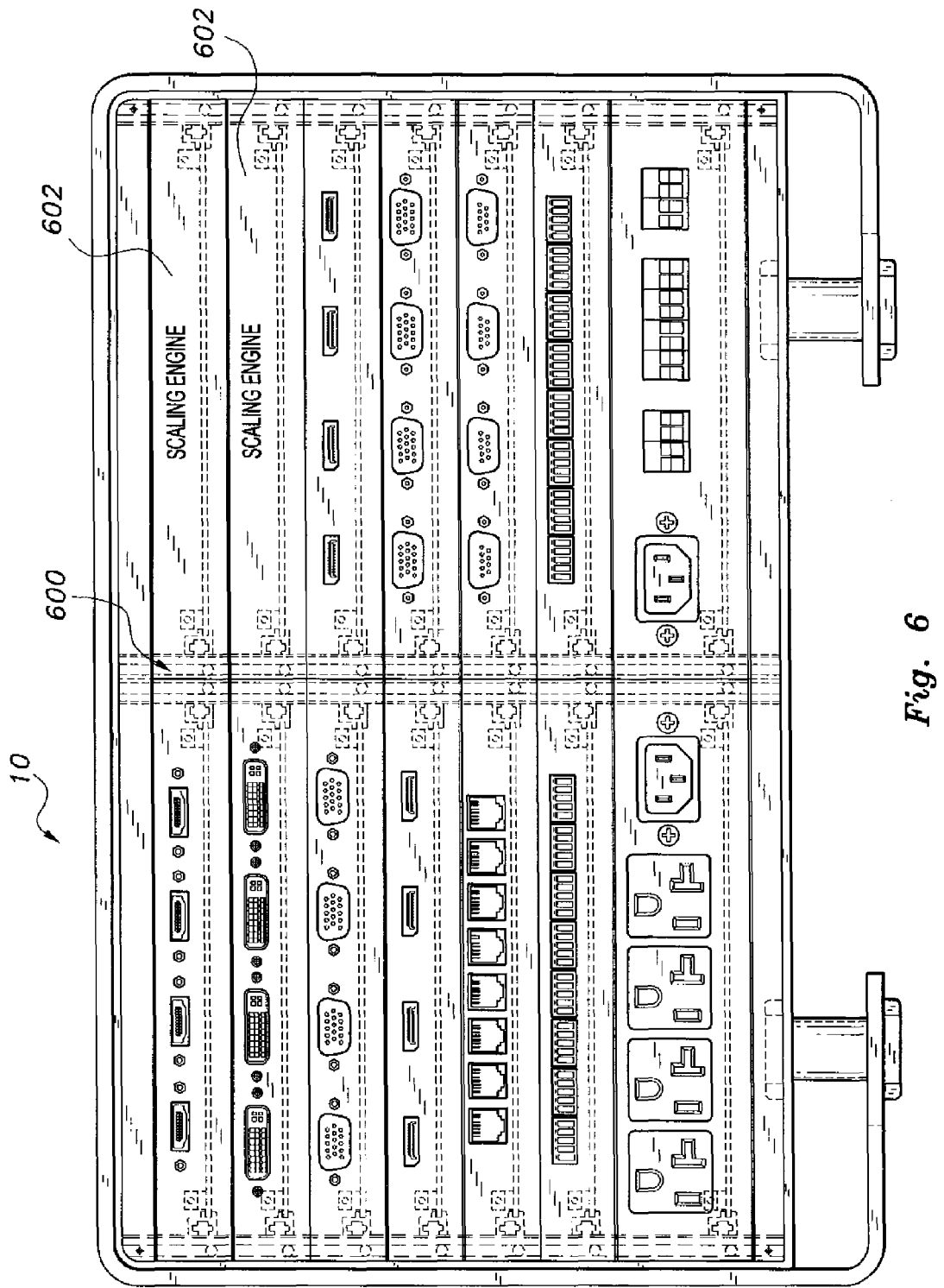
FIG. 6 is a rear view showing an exemplary dual backplane embodiment of the power and data hub according to the present invention.

As shown in FIG. 6, an alternative embodiment of the device 10 has a dual backplane 600 that supports hot swappable connection of digital video scaling engines 602. The device provides an all-in-one integrated modular chassis, where each module 33b performs specific functions, such as source signal switching and input signal resolution scaling of audio-visual devices, data input/output processing, control of other connected devices, capture of camera inputs, etc. The hub 10 provides data integration, web services and power management to the modules 33b and the aforementioned externally connected devices XD, and, via the control management software, stops all power usage for any of the internal or external devices detected by the unit 10 to be in standby mode. Moreover, the control management software issues control protocol-based programmed instruction commands, which enable an internal module 33b or an external device XD to power itself up and perform its independent functions when the device (33b or XD) is connected to a data network or directly to a computer having device specific management software.

The main housing unit 12 of the hub 10 is preferably made of 100% recycled aluminum, which forms a protective shell for the electronic components of the hub 10. Preferably 100% recycled aluminum modular front peripheral wall framing 14a and lateral peripheral wall framing 14b are enclosed by the main housing member 12, which, due to aeration holes in the peripheral wall framing 14a and 14b in combination with the solid C-shaped main housing member 12, forms a natural heat sink, thereby dissipating heat generated by the powered electronics housed in the main housing member 12. The main housing member 12 may include an upper housing plate 20, an intermediately located fix plate 40, and a lower housing plate 50, each of which is secured to the main housing member 12 by any suitable fastening means, such as screws, nuts and bolts, or the like. In the particular example illustrated, anchor supports 60 are disposed through the bottom housing plate 50 and through bottom peripheral edges of the main housing member 12 to provide firm footing for placement of the hub 10 on a flat surface.

It is to be understood that the present invention is not limited to the embodiment described above, but encompasses any and all embodiments within the scope of the following claims.

I claim:

1. A power and data hub, comprising:
    an enclosure for a plurality of thin, modular, hot swappable electronic circuit boards, the enclosure forming a heat dissipating, protective shell, the enclosure including a peripheral wall framework having aeration holes defined therein, the wall framework closing off front and lateral sides of the circuit board enclosure and allowing further heat dissipation from an interior of the circuit board enclosure;
    a rear panel closing off the rear portion of the circuit board enclosure, the rear panel having slots adapted for receiving hot swappable configured electronic circuit board modules;
    a control protocol server disposed in the modular circuit board enclosure;
    a TCP/IP port operably connected to the control protocol server, the TCP/IP port facilitating data exchange between an external data network and the control protocol server;
    a PoE TCP/IP port operably connected to the control protocol server, the PoE TCP/IP port facilitating power control data exchange between the external data network and the control protocol server;
    an externally accessible AC mains receptacle disposed in the modular circuit board enclosure;
    an AC distribution unit disposed in the modular circuit board enclosure, the AC distribution unit accepting mains power from the AC mains receptacle;
    a plurality of externally accessible AC switched outlets disposed in the modular circuit board enclosure, the outlets being connected to the AC distribution unit;
    externally accessible DC outlets having a plurality of different DC output voltage type connectors;
    a DC aggregator/distributor disposed in the modular circuit board enclosure, the DC aggregator/distributor outputting voltages to the DC outlets according to the DC output voltage type connectors;
    a plurality of AC/DC transformers interconnecting the AC distribution unit and the DC aggregator/distributor;
    power control relays connected to the AC distribution unit for selectively configuring the DC power distribution;
    a DC power injector system accepting output from the DC aggregator/distributor;
    a multiport TCP/IP router modular circuit board disposed in the modular circuit board enclosure;
    a switch fabric electronic backplane disposed in the modular circuit board enclosure, the switch fabric electronic backplane being operably connected to the control protocol server and to the DC power injector system, the switch fabric electronic backplane being operably connected to the modular circuit boards to inject low voltage DC current and command protocols to inserted ones of the hot swappable configured electronic circuit board modules, to the multiport TCP/IP router modular circuit board, and to external devices connected to the external data network;
    means for controlling the switch fabric electronic backplane for cross-matrix switching, wherein an input of any first of the devices/modules is switched to accept an output of any second of the devices/modules; and
    means for controlling the switch fabric electronic backplane for power injection switching, wherein the any first of the devices/modules is powered up responsive to connection to an active any second of the devices/modules, and the any first of the devices/modules is completely powered down responsive to the any first of the devices/modules entering a standby mode.

2. The power and data hub according to claim 1, wherein said modular circuit board enclosure is made of 100% recycled aluminum.

3. The power and data hub according to claim 1, wherein said peripheral wall framework is made of 100% recycled aluminum.

4. The power and data hub according to claim 1, wherein said hot swappable electronic circuit board modules are selected from the group consisting of audio, video, data, analog signal input-output and signal processing, digital signal input-output and signal processing modules.

5. The power and data hub according to claim 4, further comprising a configuration of said hot swappable electronic circuit board modules in which said configuration allows for cross-matrix switching of VGA, DVI-I, DVI-D, HDMI, USB, Composite Video, Super Video, Display-Port, Stereo Audio, and Digital Audio signals connected to said electronic circuit board module.

6. The power and data hub according to claim 1, further comprising means for remotely controlling said power and data hub over a network.

7. The power and data hub according to claim 1, further comprising means for collecting usage data of said devices/modules in a manner that makes said usage data available for further processing and reporting purposes.

8. The power and data hub according to claim 1, wherein said switch fabric electronic backplane is a dual switch fabric electronic backplane allowing for hot swappable connection of a hot swappable digital video scaling engine module.

9. The power and data hub according to claim 1, further comprising means for controlling remote said external devices over said external data network.

* * * * *